US007947250B2

(12) United States Patent
Kanazirev

(10) Patent No.: US 7,947,250 B2
(45) Date of Patent: May 24, 2011

(54) PROCESS FOR CONVERSION OF ALUMINUM OXIDE HYDROXIDE

(75) Inventor: Vladislav I Kanazirev, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 211 days.

(21) Appl. No.: 12/332,433

(22) Filed: Dec. 11, 2008

(65) Prior Publication Data

US 2010/0148116 A1 Jun. 17, 2010

(51) Int. Cl.
*C01F 7/02* (2006.01)

(52) U.S. Cl. .................................................. 423/625

(58) Field of Classification Search .................. 423/625
See application file for complete search history.

(56) References Cited

U.S. PATENT DOCUMENTS

| | | | |
|---|---|---|---|
| 2,783,124 A | 2/1957 | Grote | |
| 3,389,975 A | 6/1968 | Van Nordstrand | |
| 3,459,502 A | 8/1969 | Van Nordstrand | |
| 3,557,025 A | 1/1971 | Emerson et al. | |
| 3,623,837 A | 11/1971 | Kelly et al. | |
| 3,629,153 A | 12/1971 | Pryor | |
| 3,739,062 A | 6/1973 | Barsotti | |
| 3,878,166 A | 4/1975 | Woycheshin et al. | |
| 3,911,090 A | 10/1975 | Hem et al. | |
| 4,221,771 A | 9/1980 | van der Heem | |
| 4,292,295 A | 9/1981 | Pajot et al. | |
| 4,356,157 A | 10/1982 | Altman | |
| 4,468,375 A | 8/1984 | Misra | |
| 5,078,983 A | 1/1992 | Herold | |
| 5,286,687 A | 2/1994 | Murase et al. | |
| 5,997,836 A | 12/1999 | Sato et al. | |
| 6,013,600 A | 1/2000 | Kanazirev | |
| 7,307,033 B2 | 12/2007 | Maki et al. | |
| 7,351,394 B2 | 4/2008 | Maki et al. | |
| 2006/0252642 A1 | 11/2006 | Kanazirev | |
| 2007/0275846 A1 | 11/2007 | Kanazirev et al. | |

FOREIGN PATENT DOCUMENTS

CA 863262 2/1971

OTHER PUBLICATIONS

U.S. Appl. No. 12/332,421, filed Dec. 11, 2008, Kanazirev.
Ali, "Dawsonite-Type Precursors for Catalytic Al, Cr, and Fe Oxides: Synthesis and Characterization", Chem. Mater. 2005, 17, 6797-6804.
Yalfani, "In Situ Studies During Thermal Activation of Dawsonite-Type Compounds to Oxide Catalysts", J. Mater. Chem., 2007, 17, 1222-1229.
Noma, "NMR Study of Bicarbonate Ions on Mineral Surfaces . . . ", Symposia Paper presented before the Div. of Environ. Chem., Amer. Chem. Society, San Diego, CA, Apr. 1-5, 2001.
Christie, "Reaction of Molten Sodium Carbonate with Aluminum Oxide", Journal of Physical Chemistry, vol. 82, No. 1, 1978, pp. 33-37.
Stoica, "Reconstruction of Dawsonite by Alumina Carbonation in (NH4)2 CO3: Requisites and Mechanism", Chem. Mater. 2008, 20, 3973-3982.
Stoica, "Reforming Dawsonite by Memory Effect of AACH-Derived Aluminas", Chem. Mater. 2007, 19, 4783-4790.
Gesing, "Structure and Spectroscopic Properties of Hydrogencarbonate Containing Aluminosilicate Sodalite and Cancrinite", Zeitschrift Kristallogr. 215 (2000) 413-418.
Pitsch, "Synthesis and Characterization of Fe2O3 Containing Aluminas by Thermal Decomposition of Modified Ammonium Dawsonite", J. Mater. Chem., 2001, 11, 2498-2503.
Hackbarth, "Synthesis and Crystal Structure of Carbonate Cancrinite Na8[AlSiO4] 6CO3(H2O)3.4 . . . ", Microporous and Mesoporous Materials 30 (1999) 347-358.
Potdar, "Synthesis of Nano-Sized Porous Gamma-Alumina Powder Via a Precipitation/Digestion Route", Applied Catalysis A: General 321 (2007) 109-116.

*Primary Examiner* — Edward M Johnson
(74) *Attorney, Agent, or Firm* — Mark Goldberg

(57) ABSTRACT

The present invention is a process for the conversion of aluminum oxide hydroxide (AlOOH) to aluminum oxide. About 30 to 70 wt-% of AlOOH, about 30 to 70 wt-% ammonium hydrogencarbonate $NH_4HCO_3$ and 0 to 20 wt-% water are combined to produce a mixture. This mixture is then cured at a temperature from about 30° to about 90° C. to convert at least 5% of the AlOOH to a ammonium hydroxycarbonate (dawsonite-type) intermediate and then the dawsonite-type intermediate is decomposed at a temperature from about 130° to 320° C. to produce aluminum oxide. The aluminum oxide can be further calcined at 500° to 800° C. to produce a gamma-theta phase alumina.

21 Claims, 5 Drawing Sheets

PROCESS FOR CONVERSION OF ALUMINUM OXIDE HYDROXIDE

BACKGROUND OF THE INVENTION

The present invention involves a process for conversion of aluminum oxide hydroxide (AlOOH) to aluminum oxide, also known as alumina. More specifically, the invention involves a much lower temperature process for conversion of AlOOH to alumina than the previous state of the art process.

Aluminum oxide hydroxide AlOOH-Boehmite or Pseudoboehmite (PB) is the most used precursor in the production of alumina porous supports and certain catalysts. The currently used technologies employ heat treatment of PB to decompose it to the oxide. Temperatures as high as 600° C. are needed because of the thermal stability of the PB alumina phase. There is a loss of BET surface area and pore volume in the course of the heat treatment. There is a need of technologies for efficient conversion of Boehmite to high quality aluminum oxide.

Dawsonite, sodium aluminum dihydroxide carbonate $(NaAlOH)_2CO_3)$ and its alkali metal analogs are useful compounds that either occur naturally or are synthesized by a variety of processes which in the prior art have taken place in aqueous medium. In U.S. Pat. No. 4,356,157, dawsonite was produced by combination of aluminum hydroxide and an alkali metal or ammonium hydrogencarbonate at high pressure and at temperatures between 150° and 250° C.

Pseudoboehmite is a microcrystalline alumina, and it usually possesses a relatively high surface area with high pore volume which makes this type of alumina highly desirable for the preparation of catalyst supports. Pseudoboehmite is generally prepared by the reaction of an aluminum salt with a strong base; or by the reaction of a strong acid with a basic aluminum salt under carefully controlled pH and temperature. Both batch and continuous processes of pseudoboehmite precipitation are industrially practiced. Usually, the spray drying of a slurry is the final step in the process. Depending upon the conditions, the spray drying process yields pseudoboehmite powders consisting of particles having an average particle size from about 10 to about 80 microns. In most of the cases the particles are composed of numerous subagglomerates with much smaller size.

Pseudoboehmite may be prepared from dawsonite as disclosed in U.S. Pat. No. 3,730,062 by hydrothermal conversion at temperatures of about 80° to 150° C.

SUMMARY OF THE INVENTION

The present invention is a process for the conversion of aluminum oxide hydroxide (AlOOH) to aluminum oxide. About 30 to 70 wt-% of AlOOH, about 30 to 70 wt-% ammonium hydrogencarbonate $NH_4HCO_3$ and 0 to 20 wt-% water are combined to produce a mixture. This mixture is then cured at a temperature from about 30° to about 90° C. to convert at least 5% of the AlOOH to an ammonium hydroxycarbonate (dawsonite-type) intermediate and then the dawsonite-type intermediate is decomposed at a temperature from about 130° to 320° C. to produce aluminum oxide. The aluminum oxide can be further calcined at 500° to 800° C. to produce a gamma-theta phase alumina.

Another aspect of the present invention comprises an aluminum containing composite produced by the process above consisting of aluminum oxide hydroxide base formed by agglomerated particles as these produced by spray drying of pseudoboehmite slurries combined with rod-like species embedded (entrenched) into the said base. The rod-like species consist of ammonium aluminum hydroxycarbonate (dawsonite-type) that converts to gamma-theta phase alumina upon thermal treatment

DETAILED DESCRIPTION OF THE INVENTION

The invention uses a solid state reaction between pseudoboehmite powder (AlOOH) such as Versal 250 produced by UOP LLC, Des Plaines Ill. and solid ammonium hydrogencarbonate to produce ammonium aluminum hydroxycarbonate (Dawsonite type) intermediate (AlOOH+ $NH_4CO_3=NH_4Al(OH)_2CO_3$) at a curing temperature from about 30° to 90° C. This reaction can be accelerated by the addition of up to 20% water and preferably from about 10 to 15% by weight water of the total solid reagents mass. Higher temperatures will also tend to accelerate the curing step as will the addition of from 2 to 10% dawsonite intermediate seed particles to the mixture of the Pseudoboehmite powder and the ammonium hydrogencarbonate. This curing step takes from about 2 to about 300 hours and preferably from about 2 to 24 hours. Repeating the treatment with fresh portions of ammonium hydrogencarbonate also accelerates the process. The ammonium aluminum hydroxycarbonate intermediate is then decomposed fully at a temperature of about 130° to 320° C. and preferably about 250° C. to yield quality alumina. In some embodiments of the invention this decomposition is at about 150° C. This alumina can then be calcined at a higher temperature to produce alumina of the desired surface area and pore volume. The decomposition products $NH_3$ and $CO_2$ are preferably reused by conversion to ammonium hydrogencarbonate (bicarbonate). The properties of the alumina produced by calcination of the Boehmite upgraded by solid state reaction with carbonate are superior compared to the products produced by the classical approach which is the thermal decomposition of Boehmite precursors.

The solid state reaction described above results in a very significant change in the morphology of alumina particles. While the original pseudoboehmite powder consists of particles with an average particle on the order of tens of micrometers (microns) which are combined from numerous small subagglomerates, the solid state reaction leads to a composite consisting of aluminum oxide hydroxide base combined with rod-like species embedded (entrenched) into the said base. The rod-like species consist of ammonium aluminum hydroxycarbonate (dawsonite-type) after the curing step that converts to gamma-theta phase alumina upon thermal treatment. That is, the solid state reaction produces in fact a new composite aluminum containing composite particle.

In addition to ammonium hydrogencarbonate, the carbonates that can be used include ammonium carbonate $(NH_4)_2CO_3$, ammonium sesquicarbonate $((NH_4)_2CO_3, 2NH_4HCO_3 . H_2O$, ammonium carbamate $(NH_4CO_2NH_2)$ and mixtures thereof.

Example 1

Figure 1:
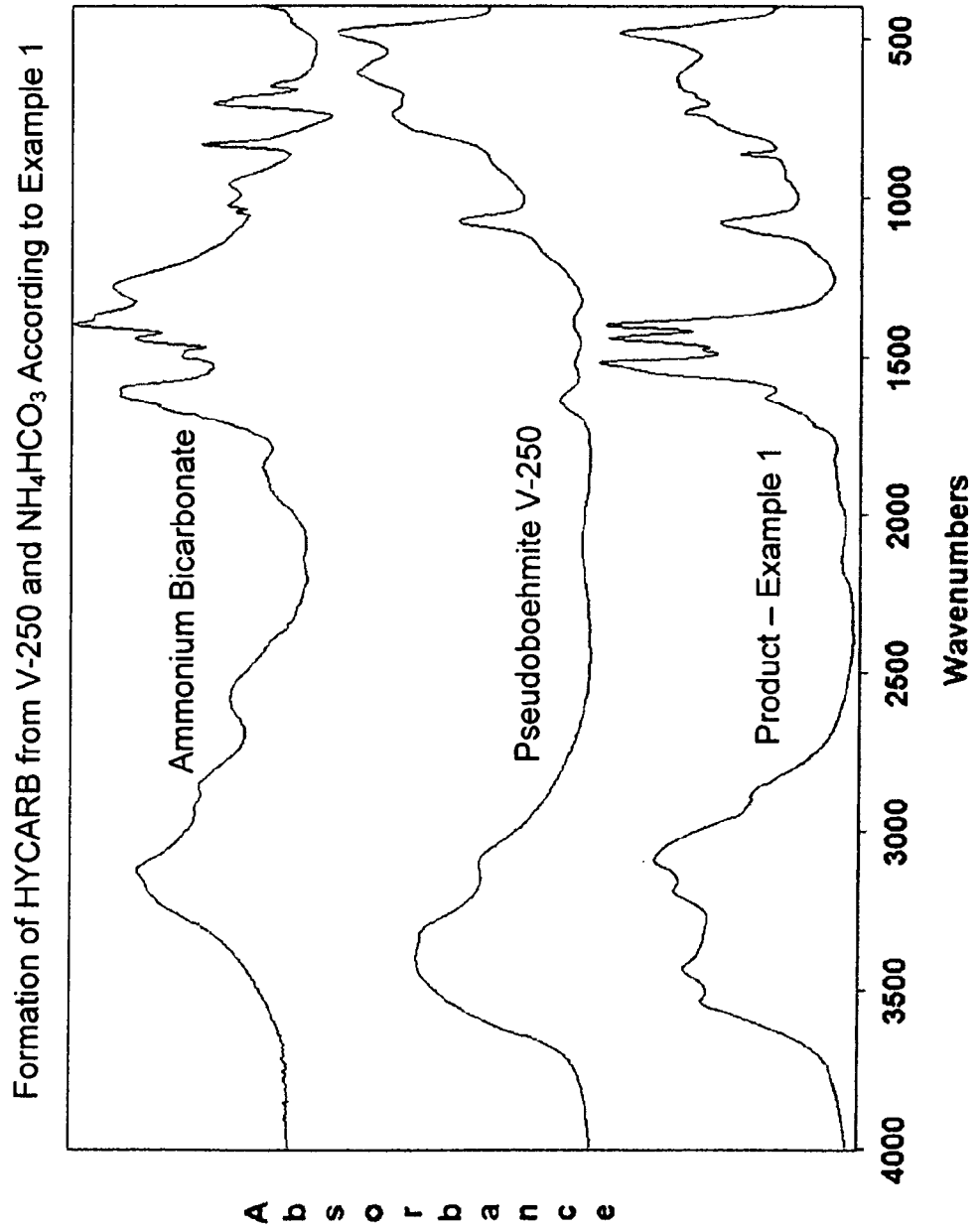
FIG. 1 is a graph illustrating the formation of HYCARB from V-250 and $NH_4HCO_3$ according to Example 1.

About 100 g powdered ammonium bicarbonate and an equal amount of Versal-250 (V-250) pseudoboehmite alumina powder, produced by UOP LLC, Des Plaines, Ill., were mixed together in a blender for about 10 minutes. The mixture was then subjected to curing at about 60° C. in a closed container whereas the pressure in the container as determined by the decomposition pressure of $NH_4HCO_3$ reagent is estimated to amount about 90 kPa. FTIR spectra of the powder mix using KBr technique showed after about 4 hours appreciable formation of a hydroxycarbonate species tentatively named here HYCARB. The species exhibits somewhat similar FTIR patterns to ammonium dawsonite $NH_4Al(OH)_2 CO_3$. FIG. 1 shows FTIR spectrum of the HYCARB product after 72 hours of curing compared with the spectra of the source components. A rough estimate suggests that at least 30% of the source V-250 material has been converted to HYCARB.

Example 2

Figure 2:
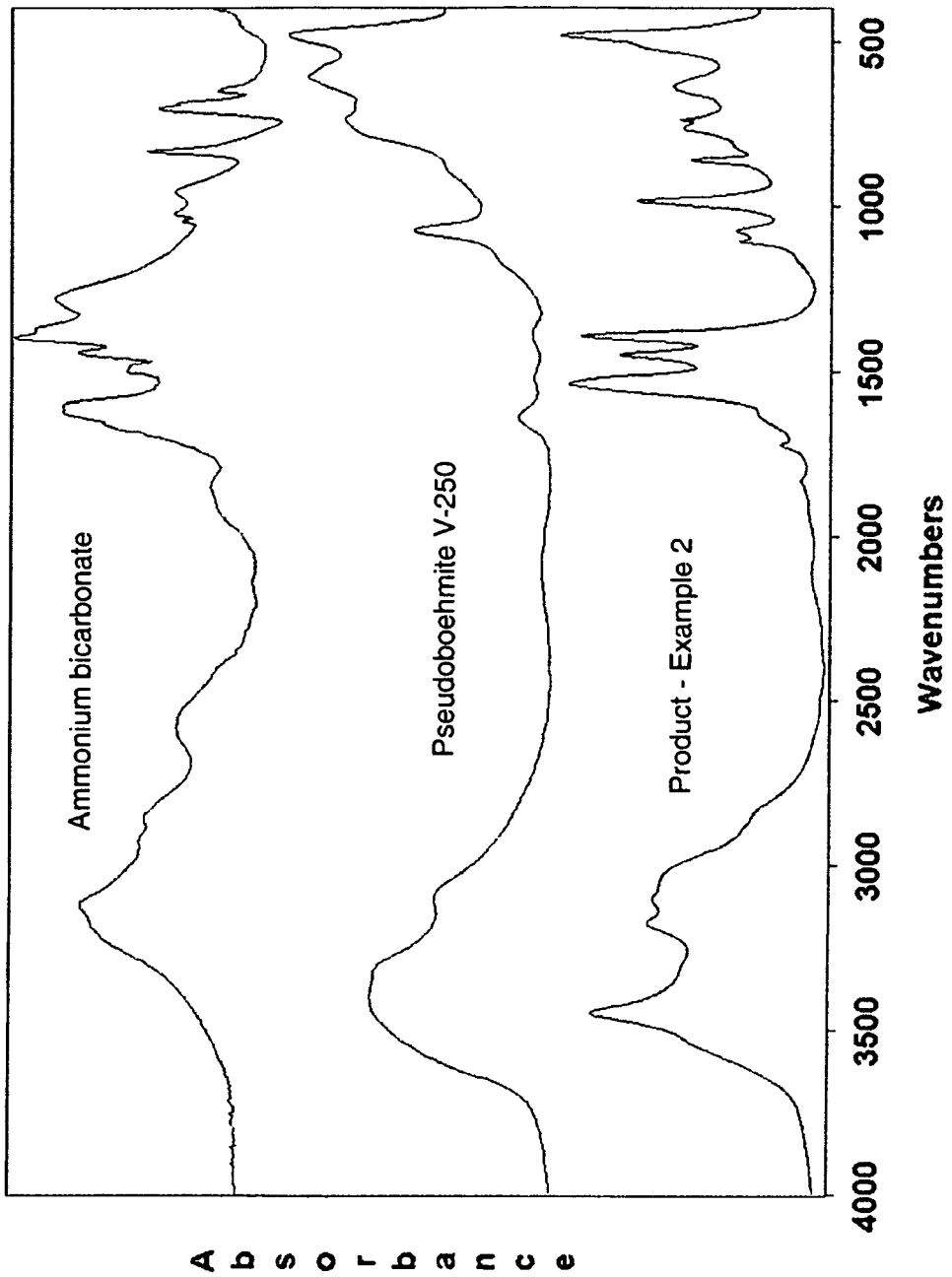
FIG. 2 is a graph illustrating the formation of $NH_4$-DAW from V-250 and $NH_4HCO_3$ according to Example 2.

The procedure described in Example 1 was used except that the product cured at about 60° C. for 24 hours was additionally cured at 78° C. for about 12 hours. The FTIR spectrum of this product presented in FIG. 2 matches closely that of ammonium aluminum hydroxycarbonate (ammonium dawsonite)-$NH_4Al(OH)_2 CO_3$ ($NH_4$-DAW) About 45% of V-250 converts to $NH_4$-DAW under these conditions.

Example 3

Figure 3:
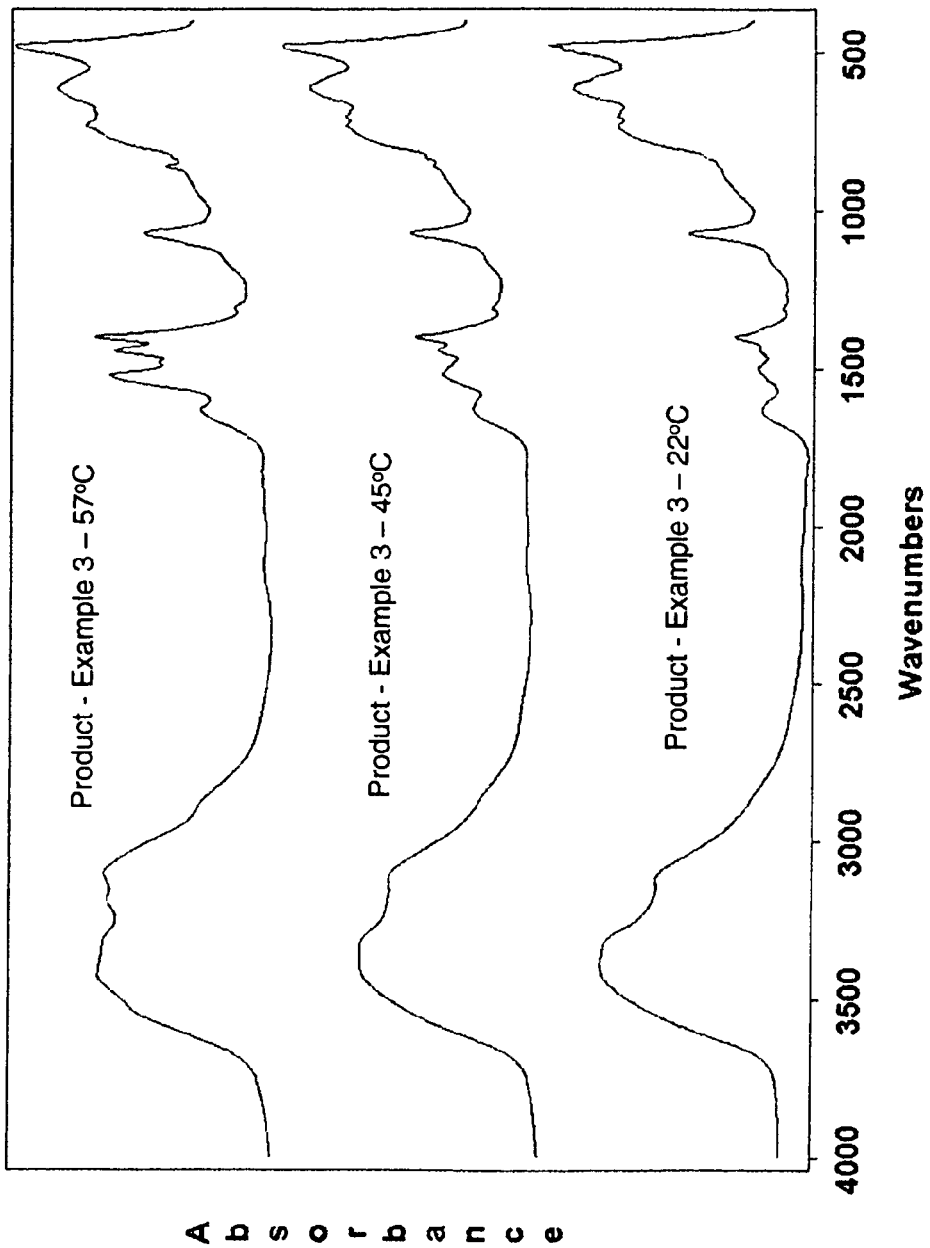
FIG. 3 is a graph illustrating the effect of temperature on HYCARB formation from dry mix of V-250 and $NH_4HCO_3$.

About 396 g powdered ammonium bicarbonate and an equal amount of V-250 pseudoboehmite alumina powder was mixed in a plastic container of about 2 liters volume. The container was shaken and rolled by hand for about 3 minutes to homogenize the mix and the resulting powder was divided in three equal parts placed in separate plastic containers. The samples were then sealed and cured at different temperatures—22° C. (room temperature), 45° C. and 57° C. All the samples produced a material which FTIR spectrum is similar to the hydroxycarbonate species tentatively named HYCARB in Example 1. FIG. 3 shows that the HYCARB content in the product as determined by the intensity of the FTIR peaks in the spectral range from about 1200 to about 1800 $cm^{-1}$ increases with the temperature. All data are for the product samples after 24 hours curing time.

Example 4

About 130 g ammonium bicarbonate and an equal amount V-250 alumina were mixed as described in Example 3 whereas about 20 g water was added on about 5 portion during the mixing process. The sample was then sealed and allowed to cure at about 45° C. in a constant temperature oven. Periodically small aliquots of the mix were sampled for FTIR analysis to gauge the progress of the reaction between bicarbonate and alumina.

Figure 4:
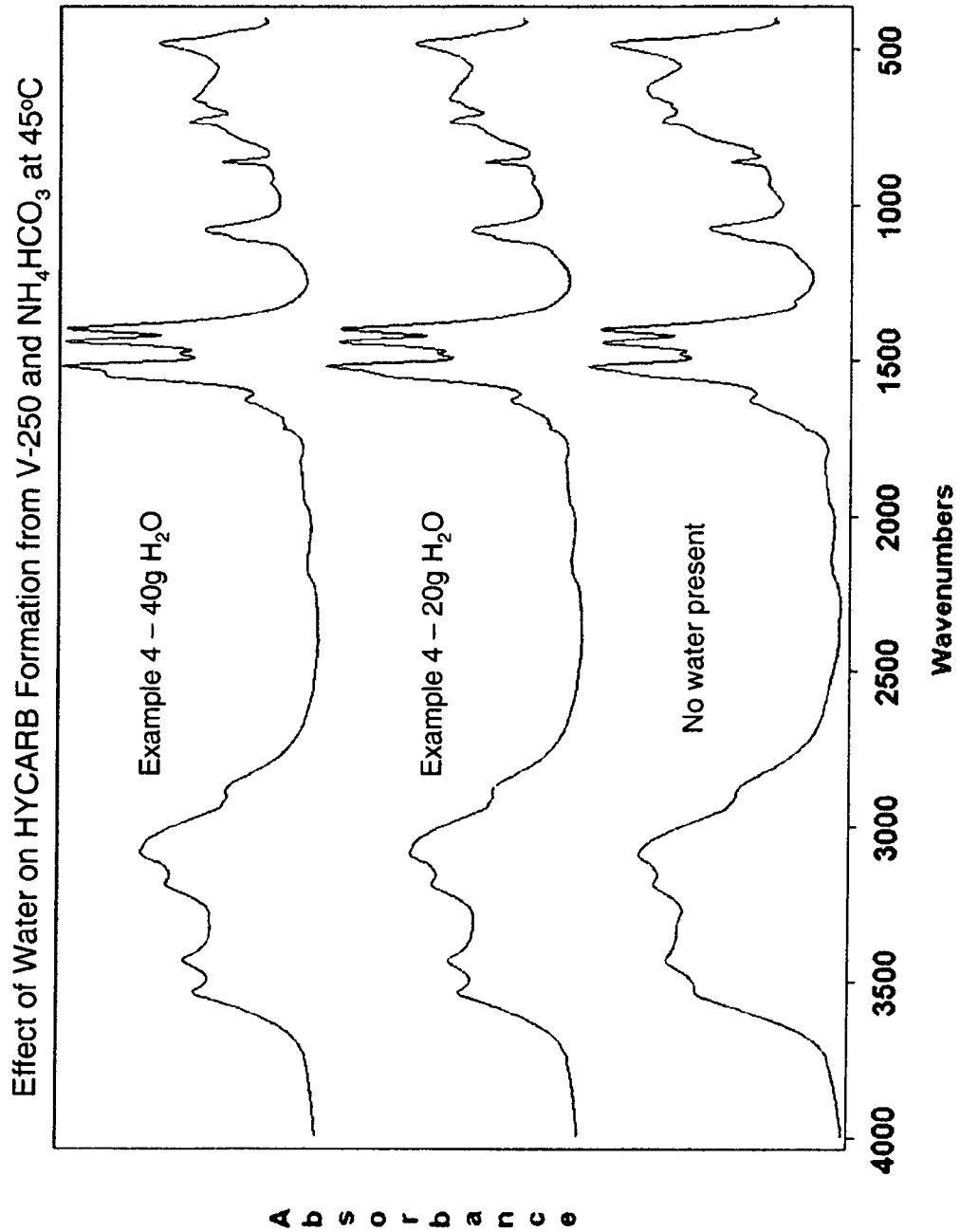
FIG. 4 is a graph illustrating the effect of water on HYCARB formation from V-250 and $NH_4HCO_3$ at 45° C.

The procedure of mixing 130 g bicarbonate and 130 g V-250 powder described above was repeated one more time whereas 40 grams water, instead of 20 grams, was added to the mix. FIG. 4 depicts the FTIR spectra of samples cured for about 192 hours. About 30% higher content of HYCARB is observed in water containing samples while there is a little difference between the mixes containing 20 and 40 grams water, respectively.

Example 5

The product from Example 1 was mixed additionally with about 21 grams water and allowed to cure for additional 24 hours. The FTIR spectrum of this product point out to a conversion of V-250 to HYCARB of at least 50%. A portion of this product was then calcined at 593° C. for about 2 hours in an oven. The X-ray diffraction patterns of the calcined product correspond to gamma alumina and are similar to the patterns of the calcined V-250 source material. The calcined product according example has higher BET surface area and pore volume (445 $m^2/g$ and 1.067 $cm^3/g$) than the calcined V-250 (414 $m^2/g$ and 0.945 $cm^3/g$), respectively.

Figure 5:
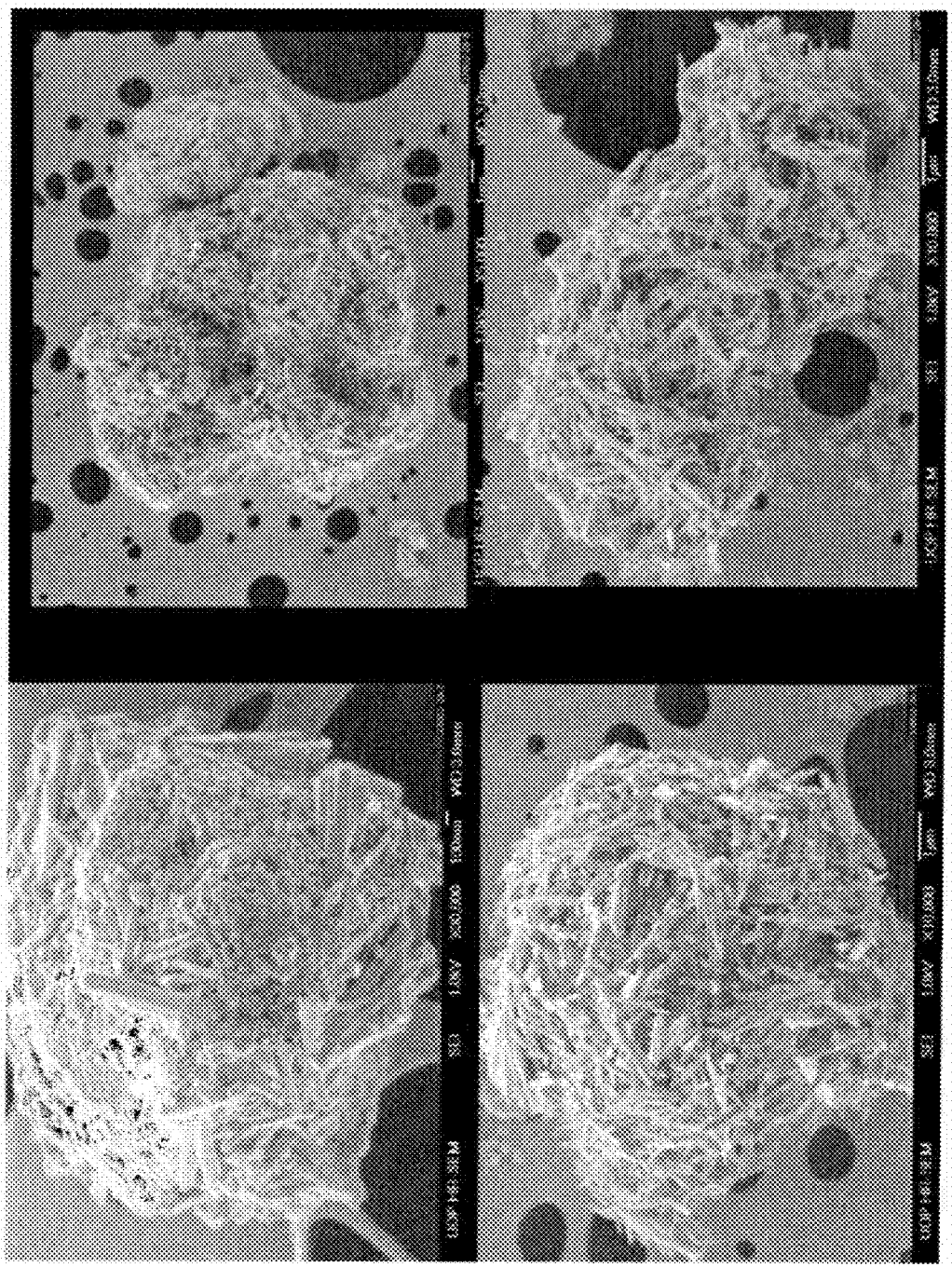
FIG. 5 is a graph illustrating the morphology of the alumina composites produced according to Example 5.

FIG. 5 shows also that this product has a specific morphology which may be useful in the forming processes involving alumina powders. The reaction can be accelerated by addition of some free water—10 to 15% of the total solid reagents mass, temperature increase or seeding with ammonium dawsonite. The final product is decomposed at 130° to 320° C., 250° to 300° C. to high quality alumina. Optionally a further calcination step can be employed at a temperature from about 500° to 800° C. The alumina produced by the present invention has the high surface area and thermal stability desired for catalyst supports and ceramic applications.

The invention claimed is:

1. A process for the conversion of aluminum oxide hydroxide (AlOOH) to aluminum oxide comprising:
   a) mixing about 30 to 70 wt-% of AlOOH, about 30 to 70 wt-% ammonium carbonate compound and 0 to 20 wt-% water to produce a mixture;
   b) curing the mixture at a temperature from about 30° to about 90° C. to convert at least 5% of said AlOOH to an ammonium aluminum hydroxycarbonate intermediate; and
   c) then decomposing said ammonium hydroxycarbonate intermediate to aluminum oxide at a temperature from about 130° to 320° C.

2. The process of claim 1 wherein said ammonium carbonate compound is selected from the group consisting of ammonium hydrogencarbonate, ammonium carbonate, ammonium sesquicarbonate and ammonium carbamate or mixtures thereof.

3. The process of claim 2 wherein said ammonium carbonate compound is ammonium hydrogencarbonate.

4. The process of claim 1 wherein said curing of said mixture is at a temperature from about 30° to about 90° C.

5. The process of claim 4 wherein said curing of said mixture is at about 60° C.

6. The process of claim 1 wherein said curing in step b) is for about 2 to 300 hours.

7. The process of claim 1 wherein said curing in step b) is for about 2 to 24 hours.

8. The process of claim 1 wherein said decomposing of said ammonium hydroxycarbonate intermediate to said aluminum oxide is at a temperature of about 250° C.

9. The process of claim 1 wherein said decomposing of said ammonium hydroxycarbonate intermediate to said aluminum oxide is at a temperature of about 150° C. and said hydroxycarbonate intermediate is fully decomposed at said temperature.

10. The process of claim 1 wherein no water is added to produce said mixture.

11. The process of claim 1 wherein 10 to 15 wt-% water is added to said mixture.

12. The process of claim 1 wherein about 2 to 10 wt-% dawsonite intermediate seeds are added to said mixture.

13. The process of claim 1 wherein ammonia and carbon dioxide are recovered after said decomposing of said dawsonite intermediate to said aluminum oxide.

14. The process of claim 13 wherein said ammonia and carbon dioxide are reacted together to produce said ammonium carbonate compound and then said ammonium carbonate compound is recycled to said mixture.

15. The process of claim 1 wherein said aluminum oxide has a BET surface area from about 350 to 700 m2/g.

16. The process of claim 1 wherein said aluminum oxide is calcined at a temperature from about 500° to 800° C. to produce a gamma-theta phase aluminum oxide.

17. An aluminum containing composite consisting of an aluminum oxide hydroxide base comprising agglomerated particles having rod-like species consisting of ammonium aluminum hydroxycarbonate embedded in said aluminum oxide hydroxide base.

18. The aluminum containing composite of claim 17 wherein said aluminum oxide hydroxide base and said ammonium aluminum hydroxycarbonate are present at a mass ratio between 100:1 to 5:100.

19. The aluminum containing composite of claim 17 that has been calcined.

20. The calcined aluminum containing composite of claim 19 comprising gamma alumina.

21. The process of claim 3 wherein the mixing with ammonium hydrogencarbonate is repeated.

* * * * *